United States Patent [19]

Nelson

[11] 4,028,308

[45] June 7, 1977

[54] POLY(CYCLOHEXANEDIMETHYLENE DIBROMOTEREPHTHALATE)

[75] Inventor: James P. Nelson, Woodridge, Ill.

[73] Assignee: Standard Oil Company (Indiana), Chicago, Ill.

[22] Filed: Aug. 21, 1975

[21] Appl. No.: 606,503

Related U.S. Application Data

[60] Division of Ser. No. 455,588, March 28, 1974, abandoned, which is a continuation-in-part of Ser. No. 263,196, June 15, 1972, abandoned.

[52] U.S. Cl. .............................................. 260/75 H
[51] Int. Cl.$^2$ .................. C08G 63/18; C08G 63/68
[58] Field of Search ................................... 260/75 H

[56] References Cited

UNITED STATES PATENTS

| | | | |
|---|---|---|---|
| 3,265,762 | 8/1966 | Quisenberry | 260/860 |
| 3,371,475 | 3/1968 | Gorrafa | 57/140 |

*Primary Examiner*—Lester L. Lee
*Attorney, Agent, or Firm*—William H. Magidson; Arthur G. Gilkes; William T. McClain

[57] ABSTRACT

Poly(cyclohexanedimethylene dibromoterephthalate). This invention relates to poly(cyclohexanedimethylene 2,5-dibromoterephthalate). More particularly this invention relates to self-extinguishing poly(cyclohexanedimethyl 2,5-dibromoterephthalate) fibers.

3 Claims, No Drawings

POLY(CYCLOHEXANEDIMETHYLENE DIBROMOTEREPHTHALATE)

This is a division, of application Ser. No. 455,588, filed Mar. 28, 1974 and now abandoned which is a continuation-in-part of Ser. No. 263,196 filed, June 15, 1972 now abandoned.

With the recent growth in the use of synthetic materials in the textile, construction, automobile, household appliances and aircraft industries there has been increasing concern for the potential and real danger that results in the incidence of damage to property and of personal injury due to the high flammability of these synthetic materials. Concern for public safety has prompted several Government agencies to make inquiries and to propose and enact legislation to impose stricter flammability standards for these synthetic materials. For example, children's sleepwear must meet rigid flammability standards. Garments which can pass this test usually have an L.O.I. (Limiting Oxygen Index) of 26 or more. In response to Government pressure the makers of synthetic materials are increasing their efforts to impart flame retardant properties to their products. Said manufacturers have in the past used additives containing phosphorous, nitrogen or halogen compounds, said compounds being physically admixed, baked on or affixed to the synthetic materials to impart fire retardancy. However, such additives tend to impart additional and often undesirable properties such as a decrease in strength, and increase in stiffness or an increase in weight of the synthetic materials. Further, it has been observed that these additives may wash off during home laundering in the case of textile synthetics and may be incompatible in the case of synthetic materials used in molding applications.

Another method for imparting flame retardancy is to produce a synthetic material incorporating a flame retarding agent whereby the flame retarding agent is made an integral part of the chemical structure of the synthetic material. One example of this method is the use of dibromopentaerythritol incorporated into the chemical structure of a polyester to impart flame retardancy. However, such synthetic materials tend to be thermally unstable leading to undesirable color formation during preparation. Accordingly, there is a need for a method of producing flame retardant polyesters.

At the present time homopolymeric polyethylene terephthalate is the polyester of choice for use in textile fibers because it has a higher melting point than other polyalkylene terephthalates and its fiber possesses an excellent balance of desirable properties. Unfortunately, when other ester forming components are included in polyethylene terephthalate, the melting point of the polymer decreases and some of the advantageous properties are lost. The higher the concentration of the third ester former, the lower the melting point and the poorer the fiber properties. Further, even the homopolymer's melting point is only marginally acceptable in home dryers and during ironing. Care must be exercised in the drying cycle and during ironing to prevent fiber fusion, etc.

Generally polyethylene terephthalate fibers are blended with hydrophilic fibers, such as cotton, rayon, wool, etc. to provide the textile with aesthetically desirable hand, moisture absorption to minimize static electricity, etc. Unfortunately blends of polyester and hydrophilic fibers have poorer fire-retardant properties than the individual fibers. For example, it is well-known that textiles prepared from polyester fiber that passes the children's sleepwear test and hydrophilic fiber that passes the children's sleepwear test often fail this test unless each of the component fibers contains substantially more fire-retardant than actually necessary to individually pass this test. This is apparently due to a latticing effect. Accordingly, there is a need for polyesters having a very high concentration of fire-retardants.

Attempts to prepare fire-retardant polyester fibers by replacing part or all of the terephthalic acid moieties in polyethylene terephthalate with 2,5-dibromoterephthalic acid moieties had been relatively unsuccessful because of the poorer properties of the polymers and fibers. For example, homopolymeric ethylene 2,5-dibromoterephthalate melts at 180°–196° C., does not crystallize when cooled down from a hot melt and is about 36% crystalline when cast from a solvent and annealed. Studies indicate that polyethylene terephthalate/2,5-dibromoterephthalate containing more than 12–15 mole percent 2,5-dibromoterephthalate can not be processed into commercially acceptable fibers due to poor mechanical properties of the fibers. Although polyethylene 2,5-dibromoterephthalate/terephthalate containing at least 10 mole percent 2,5-dibromoterephthalate moieties can provide a polyester having an L.O.I. of at least 26, this leaves (1) an exceeding narrow mole ratio range of acids for producing an unblended polyester fiber capable of meeting todays children's sleepwear minimum requirements and (2) does not provide a fiber suitable for blending hydrophilic fibers which can meet todays children's sleepwear minimum requirements. Accordingly, there is a need for fire-retardant polyesters that have good mechanical fiber properties.

The general object of this invention is to provide a fire-retardant polyester having good mechanical fiber properties. Another object of this invention is to provide a fire-retardant polyesters having good mechanical fiber properties suitable for use in hydrophilic fiber blends. Other objects appear hereinafter.

The objects of this invention can be attained with a polyester consisting essentially of a dicarboxylic acid component and 1,4-cyclohexanedimethanol component wherein the dicarboxylic acid component comprises from 15 to 100 mole percent 2,5-dibromoterephthalic acid moieties and correspondingly 85 to 0 mole percent terephthalic acid moieties. The polyesters of this invention have an L.O.I. of at least 26 and have excellent mechanical fiber properties. When the 2,5-dibromoterephthalic acid moiety is between about 55 to 100 mole percent and the terephthalic acid moiety is correspondingly between about 45 to 0 mole percent, the polyester fiber can be used in fire-retardant hydrophilic yarn blends. The homopolymer has maximum fire-retardancy and highest melting point. For the purposes of this invention other diols should be avoided to obtain maximum fiber properties.

The polyesters can be produced by reacting 1,4-cyclohexanedimethanol with the free acids or dimethyl esters of the appropriate acids at up to about 290° C.

In somewhat greater detail, dimethyl dibromoterephthalate is mixed in a reaction vessel with trans-and/or cis-1,4-cyclohexanedimethanol with or without dimethyl terephthalate. The reactor is then heated to an esterification temperature of 180°–200° C. After the reactants have melted, tetraisopropyl titanate is added as a catalyst. The tetraisopropyl titanate may be added pure or as a solution in n-butanol. After holding the temperature at 180°-200° C. for about 2 hours the temperature is raised to a condensation temperature of 250° C. for 20 minutes, then to 281-290° C. for 1.6 hours, after which the reaction vessel is cooled. The reaction products consist of a light yellow opaque polymer, which is self-extinguishing. To further purify the polymeric material it may be dissolved in hot phenol-tetrachloroethane, filtered to remove gel, and precipitated with ether. When using the free acids, catalyst can be omitted since 2,5-dibromoterephthalic acid functions as an esterification catalyst.

The polyesters have an intrinsic viscosity, as defined herein below, in the range of 0.2-1.5, the preferred viscosity being 0.25-0.35 and a bromine content of at least 7.5%. The homopolyester has a melting temperature of 250°-260° C. and a glass transition temperature of about 100° C.

The polyesters of this invention have unique characteristics that make them desirable for use in fiber applications. The subject polyesters melt at a temperature close to that of poly(ethylene terephthalate) making them desirable flame retardant substitutes for many of those applications where poly(ethylene terephthalate) is now used. It has a high percentage of bromine thus providing excellent flame retardancy characteristics. In addition, the glass transition temperature of my novel polymer is unusually high being about 100° C. This makes it a valuable material for use in permanent press fabrics and textile application. Further, the percent crystallinity and the ease with which it may be crystallized is comparable to that of poly(ethylene terephthalate). Accordingly, the polyester can be processed (spun, drawn and textured) in the same manner as conventional polyethylene terephthalate.

The preferred polyesters of this invention, wherein at least 55 mole percent of the dicarboxylic acid components are 2,5-dibromoterephthalic acid moieties, are particularly well suited for forming fire-retardant hydrophilic/polyester yarn blends. The polyester component of the blend can comprise from 35 to 85% by weight with correspondingly 65 to 15% by weight hydrophilic yarn depending upon the aesthetic properties desired. Suitable hydrophilic fibers include cotton, wool, linen, silk, rayon, regenerated cellulose, etc.

The term intrinsic viscosity as used herein is calculated according to the following equations:

$$\eta \text{ intrinsic} = \frac{F}{W} \text{ where } F = \frac{(\eta r - 1 + 3 \ln \eta r)}{16}, W = \text{sample weight (gms)}$$

wherein $\eta r$ is calculated by dividing the flow time in a capillary viscometer of a dilute solution of polymer by the flow time for the pure solvent. The intrinsic viscosity was determined in 60/40 phenol/tetrachloroethane solvent at 0.100±0.0030 grams/25 cc concentration at 30.0° C. in a 1B Ubbelhode viscometer.

As used herein the polymeric melting point, Tm, is determined by a thermoanalysis method and is defined as that point at which the polyester changes from a plastic consistency to molten liquid. The glaze transition point, Tg, is defined as that temperature where the polyester changes from glassy to brittle, to leathery, flexible, plastic, but not flowing. The crystallization temperature, Tc, is defined as that temperature at which there is enough heat to allow mobility to the molecules so they may align themselves to form a crystalline structure. The preparation of my new polyester may be further illustrated by the following example.

EXAMPLE I

A mixture of 17.6 grams of dimethyl-2,5-dibromoterephthalate and 15.86 grams of trans-1,4-cyclohexanebimethanol were combined in a small glass reactor. The reactor head was constructed in such a way as to allow a nitrogen purge to be introduced at the bottom of the reactor and a vacuum maintained. The reactor assembly was suspended in an electrically heated oil bath. The bath temperature was increased to 180°-200° C. and held for 2 hours. When the charge was molten, 50 μl of tetraisopropyl titanate catalyst, dissolved in 1 cc of n-butanol, was injected through the nitrogen inlet system. The temperature was then raised to 250° C. for 20 minutes, and then to 280°-290° C. for 1.6 hours. After this time the reactor was cooled. A light yellow opaque polymer resulted. The polymer was somewhat brittle, but was self-extinguishing. Analysis revealed that the polymer contained 29.8% bromine, compared with a calculated value of 36.1%. This material was then dissolved in hot phenol/tetrachloroethane, filtered to remove gel, and precipitated with ether. The resulting white, crystalline polyester had an intrinsic viscosity of 0.30 and a bromine content of 35.57% compared to a calculated value of 36.1% Br. Differential thermal analysis showed a polymer Tm of 175 and 240° C., and a Tg of 100° C. The polymer melted in the hot stage at 258°-261° C. Percent crystallinity as determined by X-ray diffraction was found to be 36%.

The polyester can be spun, drawn and textured into fibers in the same manner as polyethylene terephthalate. The polyester can also be blended with hydrophilic fibers in the same manner as polyethylene terephthalate.

I claim:

1. A fire-retardant polyester consisting essentially of a dicarboxylic acid component and 1,4-cyclohexanedimethanol component wherein the dicarboxylic acid component comprises from 15 to 100 mole percent 2,5-dibromoterephthalic acid moieties and correspondingly 85 to 0 mole percent terephthalic acid moieties.

2. The polyester of claim 1, wherein the 2,5-dibromoterephthalic acid moieties are between about 55 and 100 mole percent and the terephthalic acid moieties are between about 45 and 0 mole percent.

3. The polyester of claim 2, wherein the polyester is a homopolymer.

* * * * *